(12) United States Patent
Pang

(10) Patent No.: US 11,418,396 B2
(45) Date of Patent: Aug. 16, 2022

(54) EGRESS TRUNCATION FOR TAP AGGREGATION DEVICES

(71) Applicant: Arista Networks, Inc., Santa Clara, CA (US)

(72) Inventor: James Chun Pang, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 9 days.

(21) Appl. No.: 16/843,692

(22) Filed: Apr. 8, 2020

(65) Prior Publication Data

US 2021/0320843 A1 Oct. 14, 2021

(51) Int. Cl.
| | |
|---|---|
| *H04L 12/24* | (2006.01) |
| *H04L 41/08* | (2022.01) |
| *H04L 45/745* | (2022.01) |
| *H04L 69/22* | (2022.01) |

(52) U.S. Cl.
CPC ........ *H04L 41/0876* (2013.01); *H04L 45/745* (2013.01); *H04L 69/22* (2013.01)

(58) Field of Classification Search
CPC .... H04L 41/0876; H04L 45/745; H04L 69/22
USPC ....................................... 370/254
See application file for complete search history.

(56) References Cited

U.S. PATENT DOCUMENTS

| | | | | |
|---|---|---|---|---|
| 6,154,448 A | * | 11/2000 | Petersen ............ | H04Q 11/0478 370/248 |
| 9,817,066 B1 | * | 11/2017 | Kuramoto ...... | G01R 31/318594 |
| 10,819,617 B1 | * | 10/2020 | Ghule ..................... | H04L 45/20 |
| 2004/0030968 A1 | * | 2/2004 | Fan .......................... | H04L 1/241 714/704 |
| 2006/0221962 A1 | * | 10/2006 | Previdi ............... | H04L 12/5692 370/390 |
| 2010/0296396 A1 | * | 11/2010 | Brolin ................... | H04L 49/552 370/230.1 |
| 2011/0058571 A1 | * | 3/2011 | Bloch .................. | H04L 49/3036 370/428 |
| 2014/0211623 A1 | * | 7/2014 | Choi ..................... | H04L 49/505 370/235 |

\* cited by examiner

*Primary Examiner* — Obaidul Huq
(74) *Attorney, Agent, or Firm* — Fountainhead Law Group PC

(57) ABSTRACT

Some embodiments provide a method, executable by a network device, that receives a packet from a network at a first port of the network device. The method further sends the packet to a second port of the network device. The second port includes an interface and a loopback function implemented at an egress of the interface. The loopback function is configured to transmit the packet back to the network device through the interface. The interface is configured to truncate the packet upon receiving the packet from the loopback function. Upon receiving the truncated packet from the interface of the second port, the method also forwards the truncated packet to a device through a third port of the network device that is coupled to the device.

20 Claims, 6 Drawing Sheets

EGRESS TRUNCATION FOR TAP AGGREGATION DEVICES

BACKGROUND

Many networking tools exist for monitoring and/or analyzing network traffic being forwarded by a first network device to network elements. Such networking tools may receive a copy of the network traffic that is being forwarded by the first network device. A second network device can be used to manage the copies of network traffic for the network tools. For example, the second network device can receive a copy of network traffic from the first network device and distribute the copy of the network traffic to one or more the networking tools. The second network device can handle other copies of network traffic from other network devices for the networking tools.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for providing egress truncation for test access point (TAP) aggregation devices. TAP is used herein interchangeably with tap. In some embodiments, a network device is coupled to a set of source devices and a set of consumption devices. The network device is configured to operate in a tap aggregation mode. As such, the network device is configured to receive copies of packets being forwarded by a set of source devices to network elements. In addition, the network device is configured to send the packet copies received from a source device to one or more consumption devices. The network device can send different versions of the packet copies to different consumption devices. For example, the network device may send a first consumption device the entire packet copies. Additionally, the network device may send a second consumption device a portion of each of the packet copies. The network device can generate portions of the packet copies by sending the packets out of a media access controller (MAC) of a port of the network device. The MAC is configured to truncate packets when packets enter the ingress side of the MAC (also referred to as an ingress truncation function). To utilize the truncation function of the MAC, a loopback function can be configured to send packets exiting this port on the network device back into the network device where the truncation function of the MAC truncates the packets. Once the packets are sent to the port, they are looped back into the network device and truncated. Finally, the network device may forward the truncated packets to the second consumption device.

1. Example System

Figure 1:
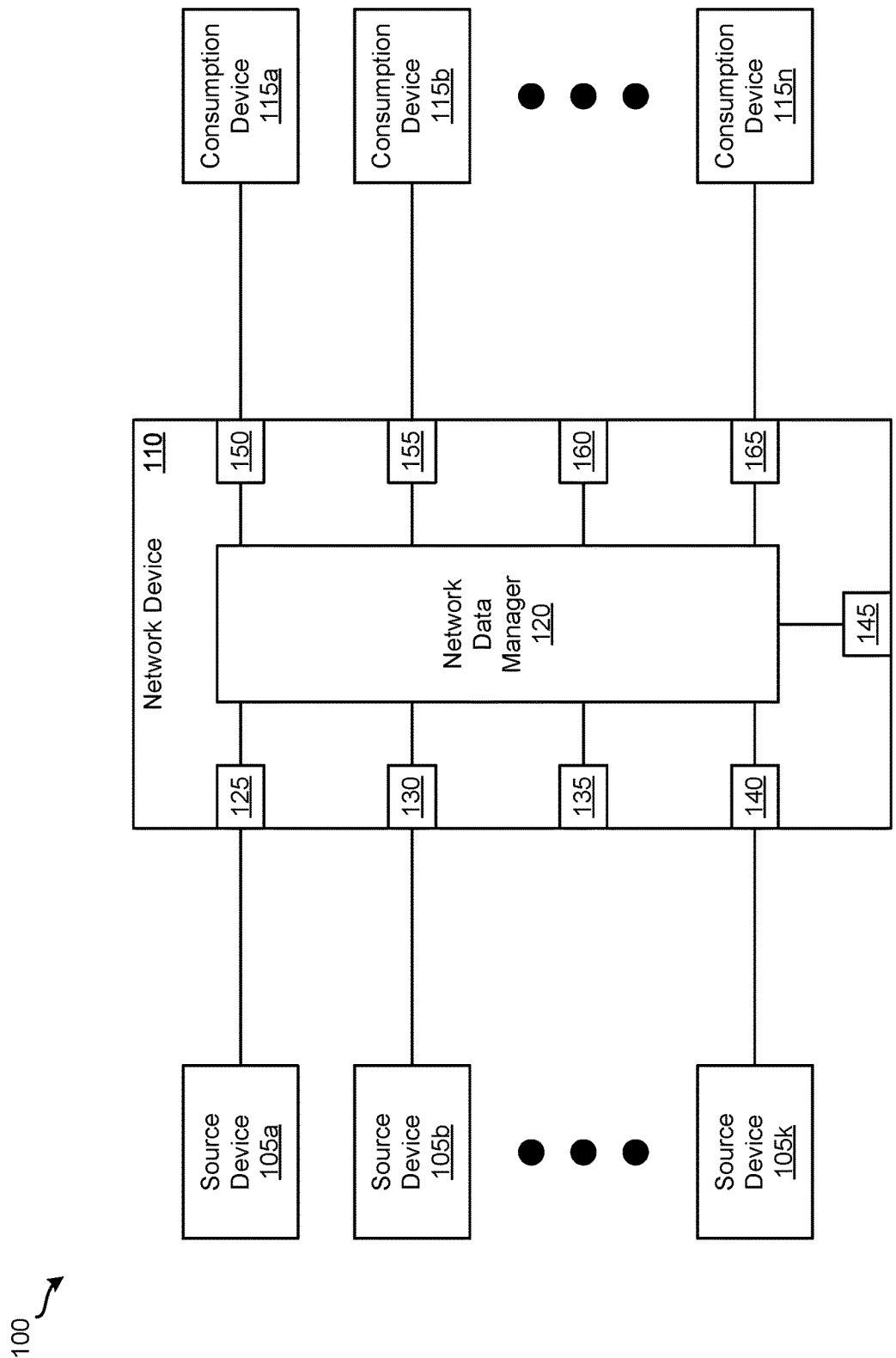
FIG. 1 illustrates a system according to some embodiments.

FIG. 1 illustrates a system 100 according to some embodiments. As shown, system 100 includes source devices 105a-k, network device 110, and consumption devices 115a-n. Source devices 105a-k are devices that receive and forward network traffic through one or more networks. For example, source devices 105a-k can be a network device (e.g., a network router, a network switch, a network bridge, a network gateway, etc.), a computing device, a mobile device, etc. Each of the source devices 105a-k is configured to send network device 110 a copy of packets that are being forwarded by the source device 105 to network elements (e.g., other network devices, network hosts, etc.). That is, network device 110 is tapping into the network traffic being forwarded by source devices 105a-k. In some instances, a tap may be implemented via a physical tap (e.g., an optical tap, an electrical tap, etc.) into a line through which a source devices 105 (e.g., source device 105a) is forwarding packets. In other instances, a tap may be implemented via a monitoring function supported by a source device 105 (e.g., source device 105b). The monitoring function sends (e.g., through a mirroring port of source device 105b) network device 110 copies of packets that source device 105 is forwarding to other network elements. As illustrated, source device 105a is configured to send network device 110 copies of packets being forwarded by source device 105a at port 125 of network device 110, source device 105b is configured to send network device 110 copies of packets being forwarded by source device 105b at port 130 of network device 110, and source device 105k is configured to send network device 110 copies of packets being forwarded by source device 105k at port 140 of network device 110.

Consumption devices 115a-n are devices that consume packet copies being forwarded by source devices 105a-k to network elements. Examples of such devices include a network monitoring device and a network analyzing device. Different consumption devices 115 can be configured to accept different versions of the packet copies from a particular source device 105. For example, for packet copies from source device 105b, consumption device 115a may be configured to accept the entire packet, consumption device 115b may be configured to accept a set of specific fields of the packet (e.g., the header, the payload, etc.), and consumption device 115c may configured to accept the first n number of bytes (e.g., 80 bytes, 120 bytes, 160 bytes, etc.) of the packet.

As shown in FIG. 1, network device 110 includes ports 125-165. In this example, ports 125-140 are tap ports, port 145 is a tap and tool port, and ports 150-165 are tool ports. In some embodiments, a tap port is a port that is configured for unidirectional communication. Specifically, each of the tap ports 125-140 is configured to receive packets from a source device 105 (e.g., copies of packets being forwarded by a source devices 105). Similarly, a tool port is configured for unidirectional communication in some embodiments. In particular, each of the tool ports 150-165 is configured to transmit packets (e.g., a version of packet copies being forwarded by a source device 105) to a consumption device 115. With such a configuration, packets flow from source devices 105a-k to consumption devices 115a-n via network device 110.

In some embodiments, a tap and tool port is a port configured for bidirectional communication. For this example, tap and tool port 145 is configured to receive packets ingressing network device 110 and to transmit packets egressing network device 110. In addition, tap and tool port 145 may include a truncation function that is configured to truncate packets that tap and tool port 145 receives down to a defined size (e.g., the first n number of bytes). After packets are truncated, network device 110 forwards the truncated packets to their intended destinations. As mentioned above, different consumption devices 115 may be configured to accept different versions of the packet copies from a particular source device 105. Thus, in cases where a consumption device 115 is configured to accept a truncated packet, the truncation function of tap and tool part 145 can be utilized.

While FIG. 1 shows one tap and tool port, one of ordinary skill in the art will appreciate that any number of additional and/or other ports of network device 110 may be configured to operate in the same or similar manner as tap and tool port 145. For example, one of the tap ports 125-140 can be configured to function like tap and tool port 145 instead of functioning as a tap port. Similarly, one of the tool ports 150-165 may be configured to function like tap and tool port 145 instead of functioning as a tool port.

In some embodiments, a tap and tool port can be employed for each consumption device 115 that is configured to accept truncated packets. For instance, if a first consumption device 115 is configured to accept a truncated version of packets received from a first source device 105, a first tap and tool port is used. If a second consumption device 115 is configured to accept a truncated version of packets received from a source device 105 (e.g., the first source device 105 or a second, different source device 105), a second tap and tool port is used. In other embodiments, a single tap and tool port can be used where packets from different source devices and destined for the same consumption device need to be truncated to the same packet size. For example, if consumption device 115c is configured to accept packets from source device 105b that are truncated to the first 140 bytes and accept packets from source device 105c that are also truncated to the first 140 bytes, a single tap and tool port (e.g., tap and tool port 145) may be used to truncate packets from source devices 105b and 105c for consumption device 115c.

In some embodiments, a single tap and tool port can be used in conjunction with identifier (ID) tagging to truncate packets for multiple consumption devices 115. ID tagging involves storing a value in a particular field of a packet to differentiate packets destined for different consumption devices. Examples of fields of a packet that are used for ID tagging include a virtual local area network (VLAN) ID field and a multiprotocol label switching (MPLS) label field. In some such embodiments, the consumption devices 115 would be configured to accept the same packet size. For example, if consumption device 115a is configured to accept packets from source device 105b that are truncated to the first 120 bytes and consumption device 115n is configured to accept packets from source device 105b that are also truncated to the first 120 bytes, a single tap and tool port (e.g., tap and tool port 145) can be used to truncate packets from the same source device 105b for both consumption devices 115a and 115n. Moreover, a single tap and tool port may be used in conjunction with ID tagging to truncate packets from different source devices 105. For instance, if consumption device 115b is configured to accept packets from source device 105a that are truncated to the first 160 bytes and consumption device 115c is configured to accept packets from source device 105b that are also truncated to the first 160 bytes, a single tap and tool port (e.g., tap and tool port 145) may be used to truncate packets from source devices 105a and 105b for consumption devices 115b and 115c, respectively. However, if different consumption devices are configured to accept packets from a source device truncated to different sizes, different tap and tool ports are employed. For example, if consumption device 115n is configured to accept packets from source device 105a that are truncated to the first 80 bytes and consumption device 115a is configured to accept packets from source device 105k that are truncated to the first 150 bytes, then two different tap and tool ports are utilized—a first tap and tool port configured to truncate packets from source device 105a to the first 80 bytes for consumption device 115n and a second tap and tool port configured to truncate packets from source device 105k to the first 150 bytes for consumption device 115a.

Network data manager 120 is responsible for managing the flow of data from source devices 105a-k to consumption devices 115a-n. For instance, network data manager 120 can be configured to manage tool groups. In some embodiments, a tool group includes a set of tool ports and/or tap and tool ports that are defined to receive packets from a tap port. In other words, a tool group is a defined multicast group of ports. As described above, different consumption devices 115 connected to tool ports specified in a tool group may be configured to accept different versions of a packet. For example, consumption device 115a, which is connected to tool port 150, may be configured to accept the entire packet from source device 105k while consumption device 115b, which is connected to tool port 155, may be configured to accept the first n number of bytes (e.g., 80 bytes, 120 bytes, 160 bytes, etc.) of the packet from source device 105k. In this example, a tool group for tap port 140 (i.e., the tap port to which source device 105k is connected) includes tool port 150 and tap and tool port 145 since consumption device 115a does not need truncated packets and consumption device 115b needs truncated packets.

Network data manager 120 uses tool groups to determine how to process packets received from a source device 105. For instance, when network data manager 120 receives a packet from a tap port, network data manager 120 identifies the tool group associated with the tap port. Next, network data manager 120 replicates the packet for each tool port and/or tap and tool port in the tool group. Then, network data manager 120 sends a replicated packet to each tool port and/or tap and tool port in the tool group.

In some embodiments where a single tap and tool port is utilized to truncate packets destined for several consumption devices 115, network data manager 120 can use ID tagging to indicate which packets are to be forwarded to which consumption devices 115. In some such embodiments, a tool group would specify the number of replicated packets to send to the tap and tool port and a list of IDs for each replicated packet. For example, tap and tool port 145 may be configured to truncate packets to a defined packet size and consumption devices 115b and 115c are configured to accept packets from source device 105b that are truncated to the defined packet size. A tool group defined for tap port 130 specifies that two replicated packets are to be sent to tap and tool port 145. In addition, the tool group in this example specifies that one replicated packet is to be tagged with an ID value of 5 and a second replicated packet is to be tagged with a second ID value of 10. When network data manager 120 receives a packet from source device 105b via tap port 130, network data manager 120 replicates two packets, tags the first replicated packet with the ID value of 5, and tags the second replicated packet with the ID value of 10 in order to differentiate the two packets. Network data manager 120 sends the tagged packets to tap and tool port 145 for truncation. The ID tags of the packets are used to determine how to forward the packets after the packets are truncated.

A similar technique can be used in some embodiments where a single tap and tool port is employed to truncate packets from different source devices and destined for different consumption devices to the same packet size. For instance, tap and tool port 145 may be configured to truncate packets to a defined packet size, consumption devices 115a is configured to accept packets from source device 105a that are truncated to a defined packet size, and consumption devices 115b is configured to accept packets from source device 105b that are truncated to the same defined packet size. A first tool group defined for tap port 125 specifies that one replicated packet is to be sent to tap and tool port 145 and specifies that the replicated packet is to be tagged with an ID value of 20. Also, a second tool group defined for tap port 130 specifies that one replicated packet is to be sent to tap and tool port 145 and specifies that the replicated packet is to be tagged with an ID value of 30. When network data manager 120 receives a packet from source device 105a via tap port 125, network data manager 120 replicates one packet, tags the replicated packet with the ID value of 20, and sends the tagged packet to tap and tool port 145 for truncation. When network data manager 120 receives a packet from source device 105b via tap port 130, network data manager 120 replicates one packet, tags the replicated packet with the ID value of 30, and sends the tagged packet to tap and tool port 145 for truncation. The ID tags of the packets are used to determine how to forward the packets to consumption devices 115a and 115b after the packets are truncated. In some embodiments, the ID tags that network data manager 120 employs are VLAN ID tags. That is, network data manager 120 uses the VLAN ID field of the packet header to store an ID value. In other embodiments, the ID tags that network data manager 120 utilizes are MPLS label tags. As such, network data manager 120 uses the MPLS label field of the packet header to store an ID value.

2. Example Network Device

Figure 2:
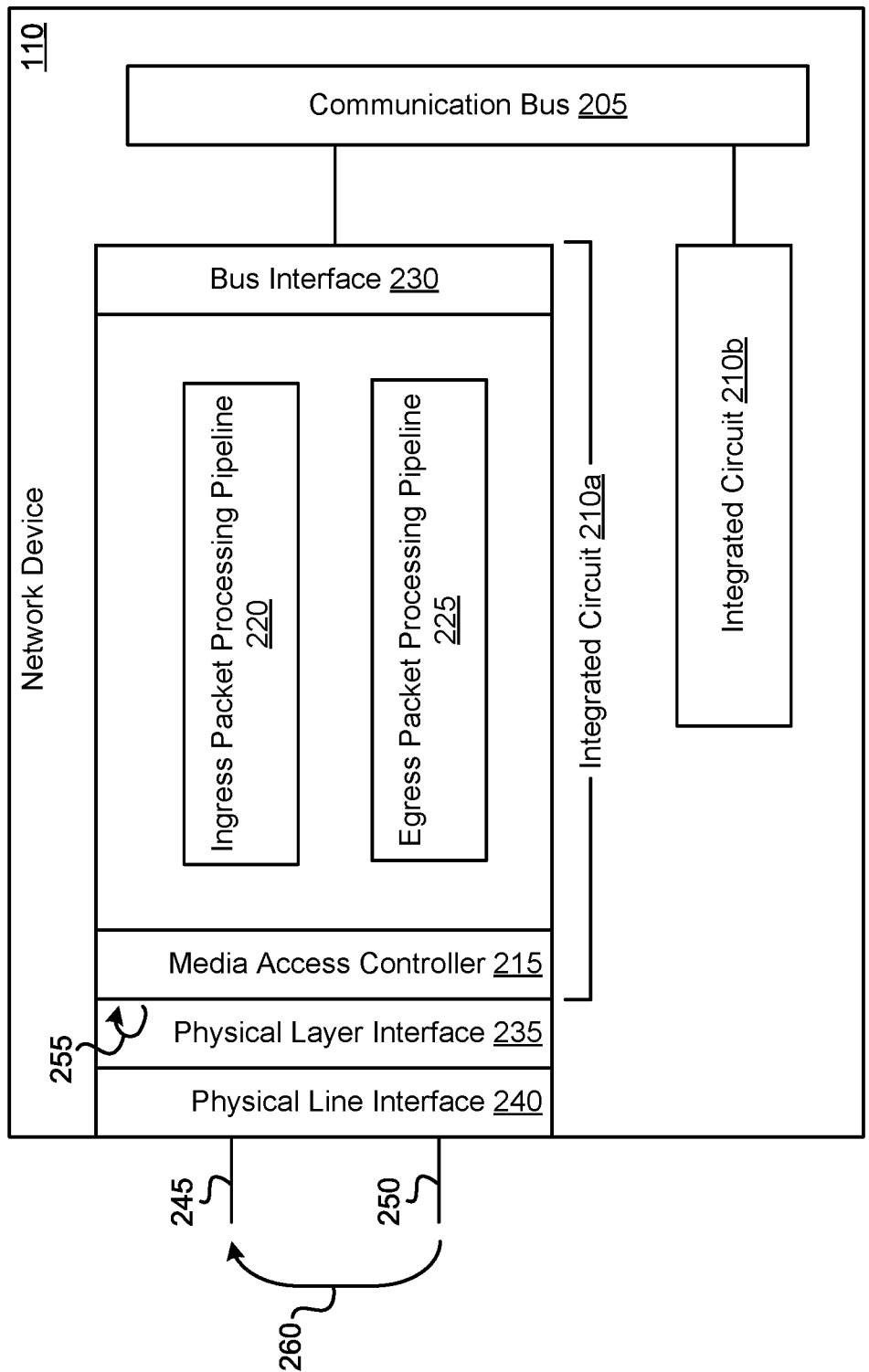
FIG. 2 illustrates a network device according to some embodiments.

The section above describes a system in which a network device is used to manage the flow of packets from source devices to consumption devices. This section will describe an example architecture of such a network device. FIG. 2 illustrates network device 110 according to some embodiments. As shown, network device 110 includes communication bus 205, integrated circuits (ICs) 210a and 210b, physical layer interface 235, physical line interface 240, and physical lines 245 and 250. Communication bus 205 is communicatively coupled to ICs 210a and 210b and is configured to facilitate communication of data (e.g., packets) between ICs 210 and 210b. In some embodiments, communication bus 205 can be implemented using one or more fabric modules.

ICs 210a and 210b are used to implement ports in network device 110. For this example, IC 210a is used to implement tap and tool port 145. IC 210b includes the same or similar components as the ones shown in IC 210a. In addition, IC 210b is a coupled to a physical layer interface, a physical line interface, and physical lines in the same or similar manner as that shown for IC 210a. However, for the purposes of simplicity and explanation, none of these components are shown for IC 210b. Also, one of ordinary skill in the art will understand the network device 110 may include additional ICs that are the same or similar to ICs 210a and 210b.

As illustrated in FIG. 2, IC 210a includes media access controller (MAC) 215, ingress packet processing pipeline 220, egress packet processing pipeline, and bus interface 230. Bus interface 230 provides an interface between IC 210a and communication bus 205. When IC 210a wants to send a packet to another IC (e.g., IC 210b), IC 210a sends the packet to bus interface 230.

MAC 215 is configured to perform layer 2 operations. For example, MAC 215 can be responsible for controlling the hardware responsible for interacting with wired, optical, or wireless transmission mediums. In some embodiments, MAC 215 may be configured with a maximum packet length on its ingress side. When configured with a maximum packet length of n bytes and MAC 215 receives an ingress packet (i.e., receiving a packet from physical layer interface 235), MAC 215 accepts the first n number of bytes of a packet, truncates (e.g., discards) the rest of the packet, and sends the truncated packet to ingress packet processing pipeline 220 for processing.

Ingress packet processing pipeline 220 is configured to process packets that are ingressing network switch 110 and determine how to forward packets based on entries in a forwarding information base (FIB) (also referred to as a forwarding table or a MAC table) included in IC 210a (not shown). In instances where packets received from a source device 105 are sent (e.g., by network data manager 12) to tap and tool port 145 are to be forwarded to a particular consumption device 115, the FIB is configured with an entry specifying that any packets received from tap and tool port 145 are to be forwarded to the tool port to which the particular consumption device is connected. This way, when ingress packet processing pipeline 220 receives a packet from tap and tool port 145, ingress packet processing pipeline 220 can forward the packet to the particular consumption device 115.

As mentioned above, in some embodiments where a tap and tool port is utilized to truncate packets destined for different consumption devices 115, each replicated packet destined for a consumption device 115 is tagged with a different ID tag. In some such embodiments, the FIB is configured with entries specifying that packets tagged with a certain ID be forwarded to the tool port to which the respective consumption device is connected. For instance, packets from source device 105a are to be truncated and sent to consumption devices 115a and 115n. In this example, network data manager 120 may tag replicated packets destined for consumption device 115a with an ID of 5 and tag replicated packets destined for consumption device 115n with an ID of 10. For this example, the FIB would be configured with a first entry specifying that any packets tagged with an ID of 5 are to be forwarded to tool port 150 and a second entry specifying that any packets tagged with an ID of 10 are to be forwarded to tool port 165. In this manner, packets tagged with an ID of 5 are forwarded to consumption device 115a and packets tagged with an ID of 10 are forwarded to consumption device 115n. In some embodiments where network data manager 120 uses a VLAN ID field to tag packets, the first and second entries in the FIB would specify the ID values in the VLAN ID field. In other embodiments where network data manager 120 uses an MPLS label field to tag packets, the first and second entries in the FIB would specify the ID values in the MPLS label field.

Egress packet processing pipeline 225 is configured to process packets that are to egress out of network switch 110. For example, when a packet has been tagged with an ID (e.g., a VLAN ID, an MPLS label, etc.), egress packet processing pipeline 225 stripes (i.e., removes) the ID tag from the packet. Once egress packet processing pipeline 225 finishes processing a packet, it sends it to MAC 215.

Physical layer interface 235 provides an interface between MAC 215 and physical line interface 240. In some embodiments, physical layer interface 235 includes loopback function 255. When loopback function 255 is enabled on physical layer interface 235, packets egressing physical layer interface 235 are sent back in through physical layer interface 235 to MAC 215. Physical line interface 240 is a physical port coupled between physical layer interface 235 and physical lines 245 and 250. In some embodiments, physical line interface can be implemented as an optical transceiver or electrical transceiver. Physical lines 245 and 250 are configured to communicate signals to and from network device 110. In this example, physical line 245 is configured to receive signals from an external source and physical line 250 is configured to transmit signals to an external source. In some embodiments, loopback function 260 may be used to send signals transmitted out of physical line 250 back through physical line 245 to physical line interface 240. Loopback function 260 may be implemented as a physical loopback cable or a loopback device connected to physical line interface 240 that connects physical line 250 to physical line 245. That way, signals that are transmitted out of physical line 250 are looped back to physical line 245.

3. Example Data Flow

Figure 3:
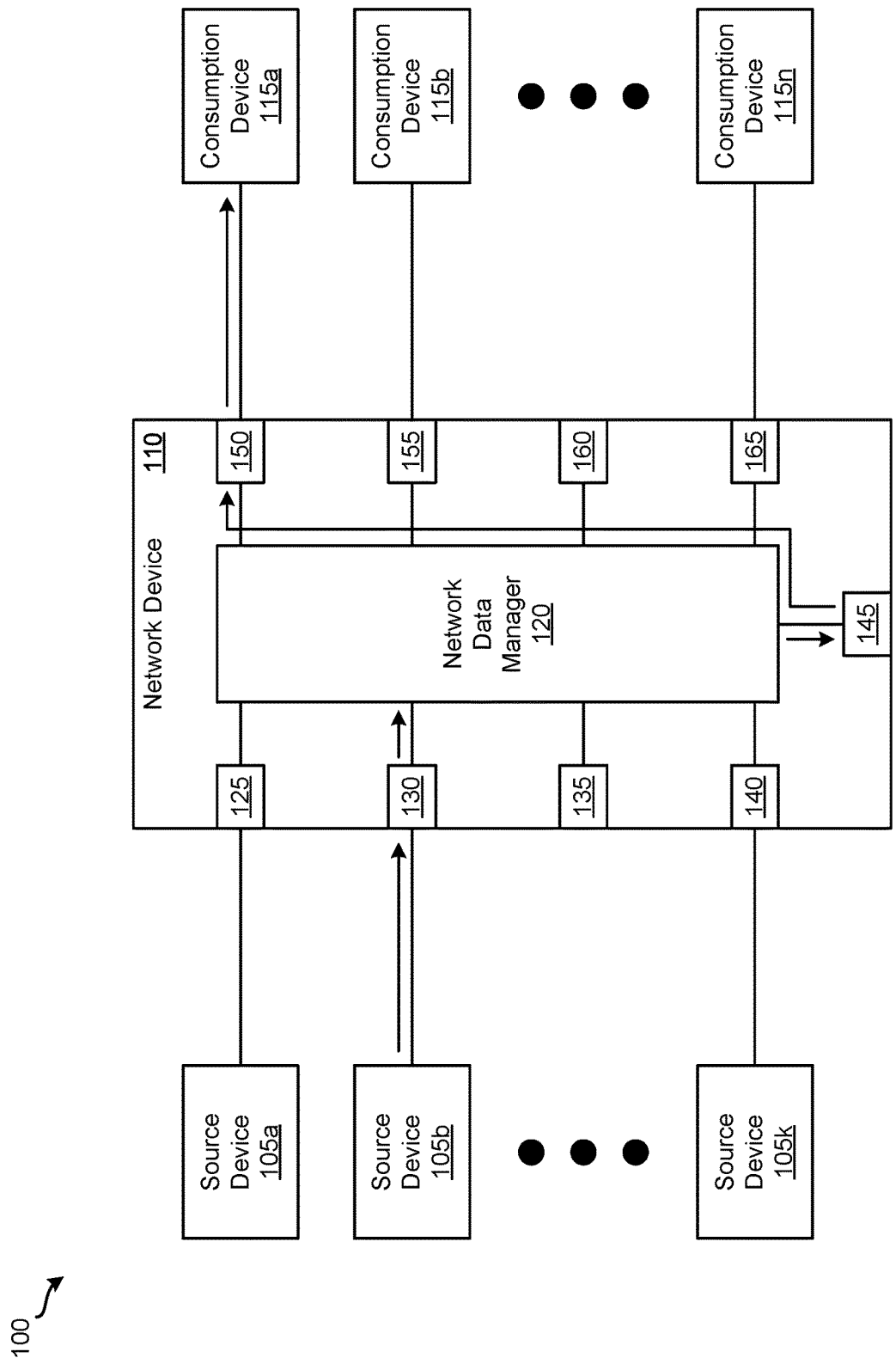
FIG. 3 illustrates an example data flow through the system illustrated in FIG. 1 according to some embodiments.

An example data flow through the system illustrated in FIG. 1 will now be described by reference to FIGS. 2 and 3. FIG. 3 illustrates an example data flow through system 100 according to some embodiments. In this example, packets that network device 110 received from source device 105b are to be sent to consumption device 115a. Also, consumption device 115a has been configured to accept packets with a size of 140 bytes. Therefore, a tool group for tap port 130 that includes tap and tool port 145 has been generated for this example. IC 210a is being used to implement tap and tool port 145. As such, MAC 215 has been configured with a maximum packet length of 140 bytes. Furthermore, loopback function 255 of physical layer interface 235 has been enabled. Finally, in this example, the FIB of ingress packet processing pipeline has been configured with an entry specifying that any packets received from tap and tool port 145 are to be forwarded to tool port 150.

The example data flow starts by network device 110 receiving, at tap port 130, a copy of a packet forwarded by source device 105b to a network element. When tap port 130 receives the packet, it sends the packet to network data manager 120. Upon receiving the packet from tap port 130, network data manager 120 identifies the tool group associated with tap port 130. In this example, the tool group associated with tap port 130 includes tap and tool port 145. Hence, network data manager 120 replicates the packet for tap and tool port 145 and sends it to tap and tool port 145.

When tap and tool port 145 receives the packet, egress packet processing pipeline 225 processes it and sends the packet to MAC 215, which transmits the packet to physical layer interface 235. As the packet egresses physical layer interface 235, loopback function 255 sends the packet back in through physical layer interface 235 to MAC 215. Once MAC 215 receives the packet from physical layer interface 235, the ingress truncation function configured for MAC 215 truncates the packet to the first 140 bytes of the packet and then MAC 215 sends the truncated packet to ingress packet processing pipeline 220.

Ingress packet processing pipeline 220 performs a lookup in the FIB when it receives the truncated packet. Because ingress packet processing pipeline 220 received the truncated packet from tap and tool port 145, the lookup of the FIB resulted in the entry specifying that any packets received from tap and tool port 145 are to be forwarded to tool port 150 as a match for the truncated packet. As such, ingress packet processing pipeline 220 forwards the truncated packet to tool port 150 where it is transmitted to consumption device 115a.

The sections above describe techniques for configuring tap ports, tap and tool ports, and tool ports in order to implement egress truncation on truncate packets received from source devices 105a-k and transmit them to consumption devices 115a-n. In some embodiments, network device 110 provides a feature for configuring tap ports, tap and tool ports, and tool ports to implement egress truncation in an automated manner. For example, network device 110 can receive (e.g., through a command line interface (CLI) or graphical user interface (GUI) provided by network device 110) a request from a user that specifies a tap port, a tool port, and a packet size. In response to the request, network device 110 generates a tool group defined for the tap port if one does not already exist. Next, network device 110 selects a tap and tool port and configures it to truncate packets to the packet size specified in the request. Then, network device 110 adds the selected tap and tool port to the tool group defined for the tap port. Also, network device 110 configures the FIB of the IC used to implement the tap and tool port with an entry for forwarding packets to tool port. In some cases a tap and tool port is already configured and being used to truncate packets to the packet size specified in the request. In such cases, network device 110 adds this tap and tool port to the tool group defined for the tap port and configures the FIB of the IC used to implement the tap and tool port with an entry for forwarding packets to tool port. The automatic configuration feature discussed above is described in terms of the network device 110 performing the various configuration operations in an automated manner. In some embodiments, a software application operating on network device 110 is used to implement the automatic configuration feature. With the automatic configuration feature, a user of network device 110 does not have to select the various ports (e.g., a tap port, a tap and tool port, and a tool port) and then configure the relationships between the selected ports (e.g., configure a relationship between the tap port and the tap and tool port and configure a relationship between the tap and tool port and the tool port).

4. Example Processes

Figure 4:
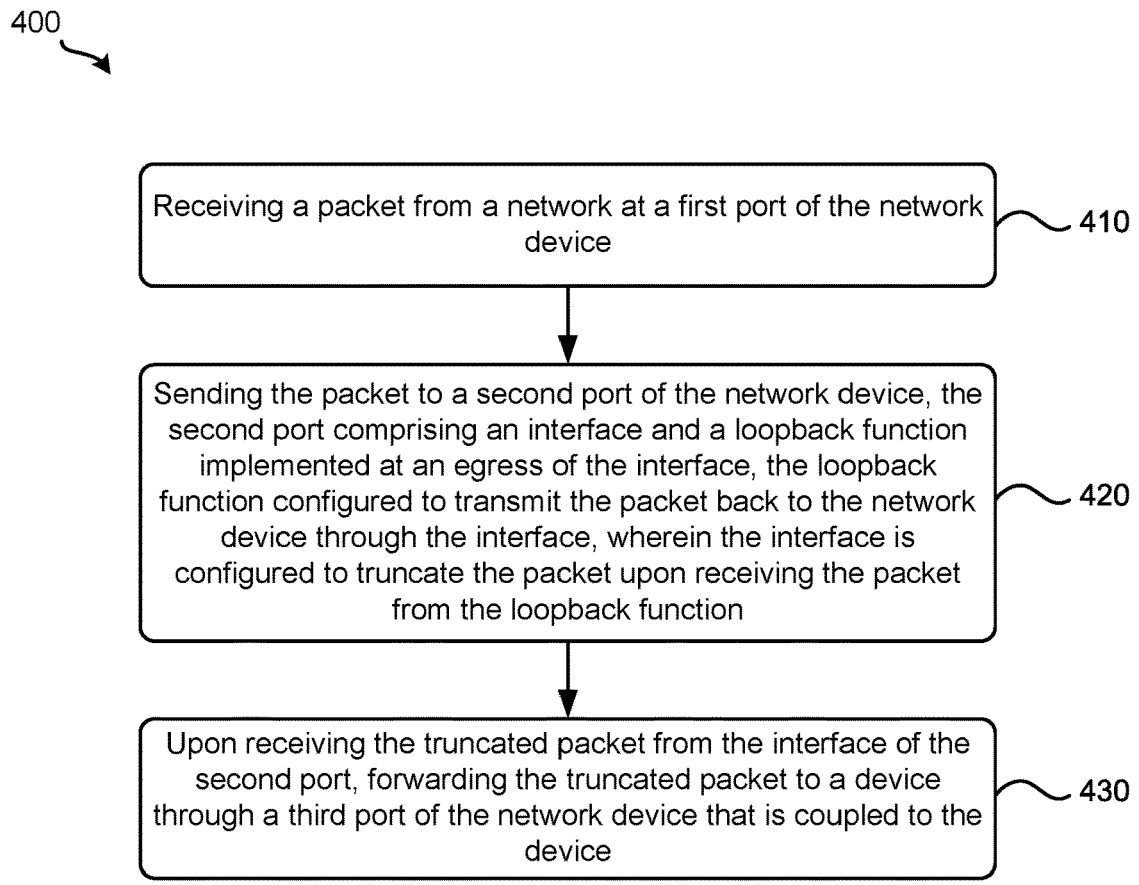
FIG. 4 illustrates a process for performing egress truncation according to some embodiments.

FIG. 4 illustrates a process 400 for performing egress truncation according to some embodiments. In some embodiments, network device 110 performs process 400. Process 400 starts by receiving, at block 410, a packet from a network at a first port of the network device. Referring to FIG. 3 as an example, network device 110 receives, at tap port 130, a copy of a packet forwarded by source device 105b to a network element.

Next, process 400 sends, at block 420, the packet to a second port of the network device. The second port includes an interface and a loopback function implemented at an egress of the interface. The loopback function is configured to transmit the packet back to the network device through the interface. The interface is configured to truncate the packet upon receiving the packet from the loopback function. Referring to FIGS. 2 and 3 as an example, network data manager 120 sends the packet to tap and tool port 145. Once tap and tool port 145 receives the packet, egress packet processing pipeline 225 of IC 210a processes it and sends the packet to MAC 215. MAC 215 sends the packet to physical layer interface 235. As the packet egresses physical layer interface 235, loopback function 255 sends the packet back in through physical layer interface 235 to MAC 215 where the ingress truncation function configured for MAC 215 truncates the packet to the first 140 bytes of the packet. MAC 215 then sends the truncated packet to ingress packet processing pipeline 220.

Finally, process 400, forwards, at block 430, the packet to a device through a third port of the network device that is coupled to the device upon receiving the truncated packet from the interface of the second port. Referring to FIGS. 2 and 3 as an example, ingress packet processing pipeline 220 performs a lookup in the FIB of IC 210a and find a matching entry specifying that any packets received from tap and tool port 145 are to be forwarded to tool port 150. Therefore, ingress packet processing pipeline 220 forwards the truncated packet to tool port 150, which transmits the truncated packet to consumption device 115a.

Figure 5:
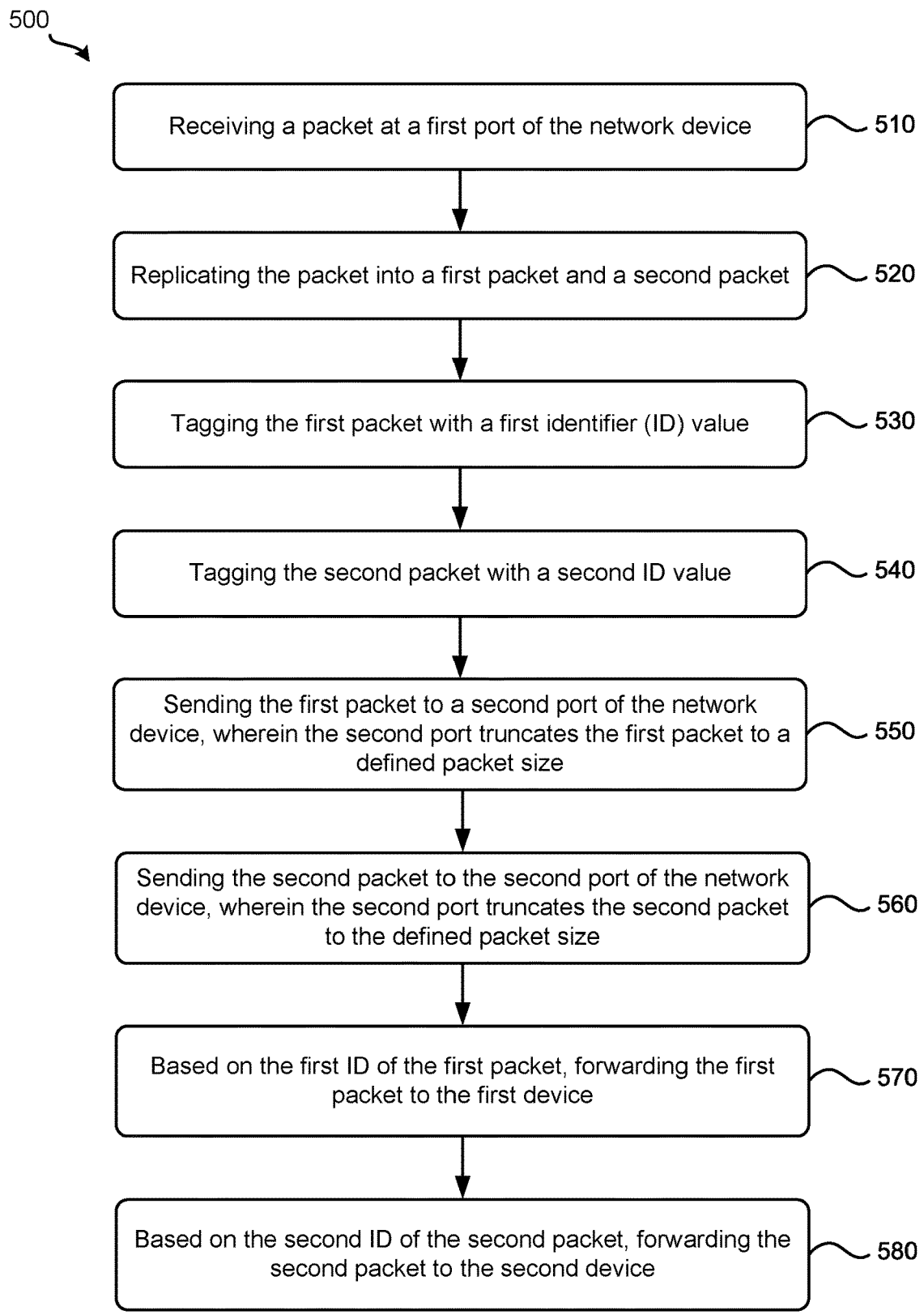
FIG. 5 illustrates a process for using ID tagging to process packets according to some embodiments.

FIG. 5 illustrates a process 500 for using ID tagging to process packets according to some embodiments. In some embodiments, network device 110 performs process 500. Process 500 begins by receiving, at block 510, a packet at a first port of the network device. Referring to FIG. 1 as an example, network device 110 receives, at tap port 125, a copy of a packet forwarded by source device 105a to a network element. The packet copy is destined for consumption devices 115b and 115n.

Next, process 500 replicates, at block 520, the packet into a first packet and a second packet. Continuing with the example above, when network device 110 receives the packet, network data manager 120 may identify a tool group associated with the tap port 125 that includes tap and tool port 145. The tool group also specifies that two packets are to be replicated with ID values of 5 and 10. As such, network data manager 120 replicates the packet into a first packet and a second packet.

Process 500 then tags, at block 530, the first packet with a first identifier (ID) value. Continuing with the example above, network data manager 120 tags the first packet with the ID value of 50. Next, process 500 tags, at block 540, the second packet with a second ID value. Continuing with the example, network data manager 120 tags the second packet with the ID value of 100.

At block 550, process 500 sends the first packet to a second port of the network device where the second port truncates the first packet to a defined packet size. For the example above, consumption devices 115b and 115n are to receive the first and second packets, respectively. Consumption devices 115b and 115n are each configured to accept a defined packet size of 110 bytes and tap and tool port 145 is configured to truncate packets to a packet size of 110 bytes. Therefore, when network data manager 120 sends the first packet to tap and tool port 145, the first packet is truncated to 110 bytes. Next, process 500 sends, at block 560, the second packet to the second port of the network device where the second port truncates the second packet to the defined packet size. Continuing with the example, once network data manager 120 sends the second to tap and tool port 145, the second packet is truncated to 110 bytes.

Based on the first ID of the first packet, process 500 then forwards, at block 570, the first packet to the first device. In the example above, the FIB of IC 210a has been configured with a first entry specifying that any packets tagged with an ID of 50 are to be forwarded to tool port 155. Upon receiving the first packet, ingress packet processing pipeline 220 performs a lookup on the FIB and determines that the first packet matches the first entry. Thus, ingress packet processing pipeline 220 forwards the first packet to consumption device 115b via tool port 155.

Finally, based on the second ID of the second packet, process 500 forwards, at block 580, the second packet to the second device. Continuing with the example above, the FIB of IC 210a has been configured with a second entry specifying that any packets tagged with an ID of 100 are to be forwarded to tool port 165. When ingress packet processing pipeline 220 receives the second packet, ingress packet processing pipeline 220 performs a lookup on the FIB and determines that the second packet matches the second entry. Hence, ingress packet processing pipeline 220 forwards the second packet to consumption device 115n via tool port 165.

5. Further Examples

The following are some example embodiments of the present disclosure. In some embodiments, a method, executable by a network device, receives a packet from a network at a first port of the network device. The method sends the packet to a second port of the network device. The second port includes an interface and a loopback function implemented at an egress of the interface. The loopback function is configured to transmit the packet back to the network device through the interface. The interface is configured to truncate the packet upon receiving the packet from the loopback function. Upon receiving the truncated packet from the interface of the second port, the method forwards the truncated packet to a device through a third port of the network device that is coupled to the device.

In some embodiments, the method may further receive a command to configure an egress truncation feature for the network device. The command may specifying the first port as an ingress port and the third port as an egress port. In response to receiving the command, the method may also automatically configure the network device to send network traffic received at the first port to the second port, configure the interface of the second port to truncate the network traffic that ingresses through the second port from the loopback device, and configure the network device to forward the network traffic received from the second to the third port.

In some embodiments, the first port is a test access point (TAP) port.

In some embodiments, the loopback function may be implemented in a physical layer interface coupled to the interface of the second port.

In some embodiments, a physical layer interface may be coupled to the interface of the second port. A physical line interface may be coupled to the physical layer interface. The loopback function may be implemented by a physical cable coupled to the physical line interface.

In some embodiments, a physical layer interface may be coupled to the interface of the second port. A physical line interface may be coupled to the physical layer interface. The loopback function may be implemented by a loopback device coupled to the physical line interface.

In some embodiments, the first port may be a unidirectional port configured to receive ingress network traffic.

In some embodiments, the third port may be a unidirectional port configured to forward egress network traffic.

In some embodiments, the packet may be a first packet. The device may be a first device. The method may further tag the first packet with a first identifier. The first packet may be forwarded to the first device based on the first identifier. The method may also receive a third packet from a network at a fourth port of the network device. The method may further tag the third packet with a second identifier. The method may also send the third packet to the second port of the network device. The loopback function may be further configured to transmit the third packet back to the network device through the interface. The interface may be further configured to truncate the third packet upon receiving the third packet from the loopback function. Upon receiving the truncated third packet from the interface of the second port, the method may further forward, based on the second identifier, the third packet to a second device through a fifth port of the network device that is coupled to the second device.

In some embodiments, the packet may be a first packet. The device may be a first device. The method may further receive a third packet from the network at a fourth port of the network device. Upon receiving the third packet from the fourth port, the method may also forward the third packet to a second device through a fifth port of the network device that is coupled to the second device.

In some embodiments, the packet may be a first packet that is a copy of a second packet transmitted through a first existing connection in the network. The device may be a first device. The method may further receive a third packet from the network at a fourth port of the network device. The third packet may be a copy of a fourth packet transmitted through a second existing connection in the network. The method may also send the third packet to the second port of the network device. The loopback function may be further configured to transmit the third packet back to the network device through the interface. The interface may be further configured to truncate the third packet upon receiving the third packet from the loopback function. Upon receiving the truncated third packet from the interface of the second port, the method may further forward the third packet to a second device through a fifth port of the network device that is coupled to the second device.

In some embodiments, the packet may be a first packet and the device may be a first device. Upon receiving the first packet from the first port, the method may further generate a second packet that is a copy of the first packet. The method may also forward the second packet to a second device through a fourth port of the network device that is coupled to the second device.

In some embodiments, the packet may be a first packet and the device may be a first device. Upon receiving the first packet from the first port, the method may further generate a second packet that is a copy of the first packet. The method may also send the second packet to the second port of the network device. The loopback function may be further configured to transmit the second packet back to the network device through the interface. The interface may be further configured to truncate the second packet upon receiving the second packet from the loopback function. Upon receiving the truncated second packet from the interface of the second port, the method may further forward the second packet to a second device through a fifth port of the network device that is coupled to the second device.

In some embodiments, the network device may include an ingress packet processing pipeline. The ingress packet processing pipeline may receive the truncated packet from the interface of the second port. The ingress packet processing pipeline may perform the forwarding of the packet to the device through the third port of the network device.

In some embodiments, the ingress packet processing pipeline may include a forwarding table. The method may further configure the forwarding table with an entry specifying that network traffic received from the second port is to be forwarded to the third port.

In some embodiments, forwarding the truncated packet to the device may include performing a lookup on the forwarding table and, based on the lookup, determining that the truncated packet matches the entry.

In some embodiments, the interface may be a physical layer interface.

In some embodiments, the interface may be further configured to truncate the packet to a defined packet size.

In some embodiments, a network device includes a processor and a non-transitory machine-readable medium that stores instructions. The instruction cause the processor to receive a packet from a network at a first port of the network device. The instruction further cause the processor to send the packet to a second port of the network device. The second port includes an interface and a loopback function implemented at an egress of the interface. The loopback function is configured to transmit the packet back to the network device through the interface. The interface is configured to truncate the packet upon receiving the packet from the loopback function. Upon receiving the truncated packet from the interface of the second port, the instruction also cause the processor to forward the truncated packet to a device through a third port of the network device that is coupled to the device.

In some embodiments, a non-transitory machine-readable medium stores a program executable by a processor of a network device. The program receives a packet from a network at a first port of the network device. The program further sends the packet to a second port of the network device. The second port includes an interface and a loopback function implemented at an egress of the interface. The loopback function is configured to transmit the packet back to the network device through the interface. The interface is configured to truncate the packet upon receiving the packet from the loopback function. Upon receiving the truncated packet from the interface of the second port, the program also forwards the truncated packet to a device through a third port of the network device that is coupled to the device.

6. Example Computer System

Figure 6:
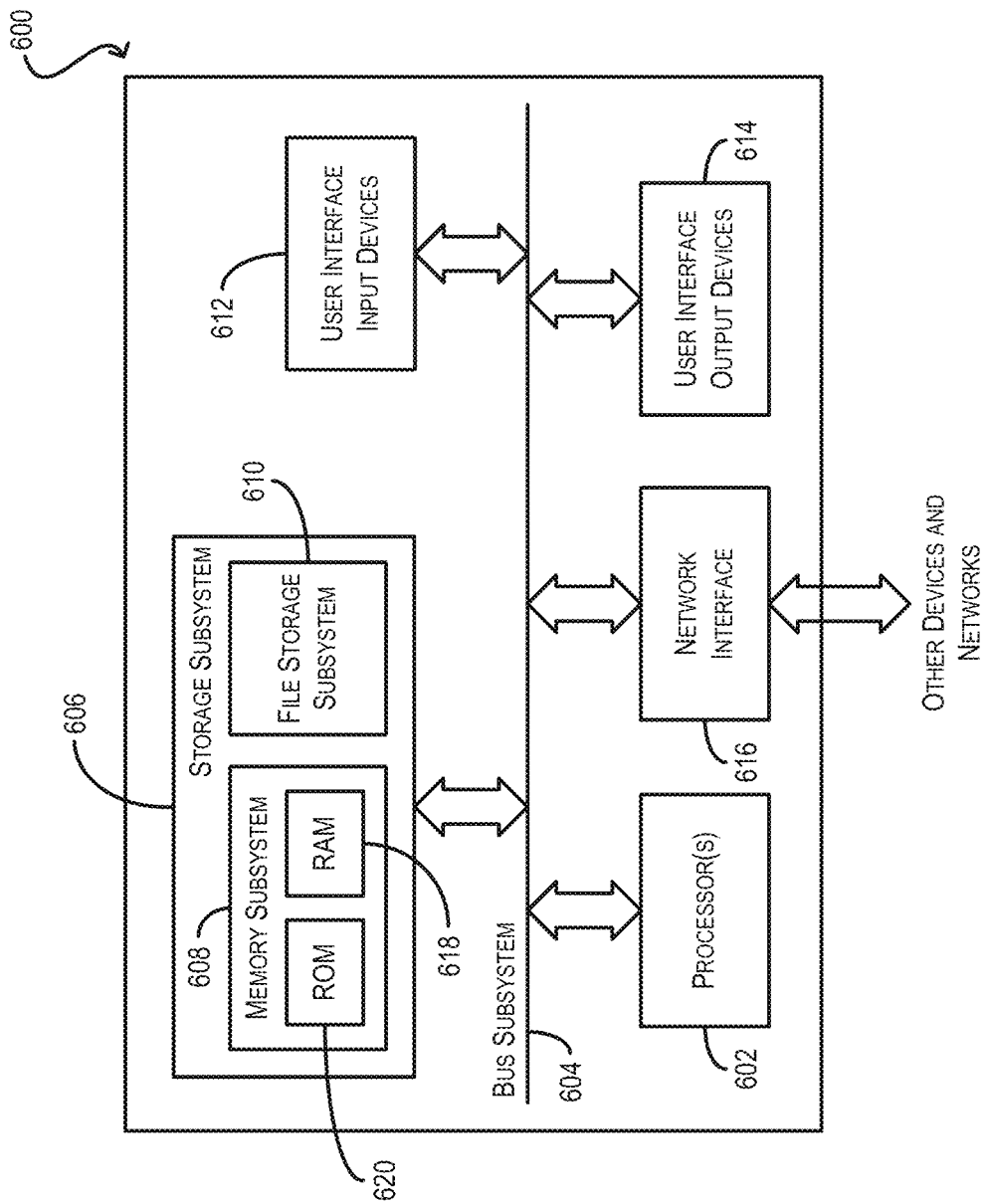
FIG. 6 illustrates an example computer system according to some embodiments.

FIG. 6 depicts an example computer system 600 according to some embodiments. Computer system 600 can be used to implement any of the computing devices, systems, servers, network elements, etc., described in the foregoing disclosure. As shown in FIG. 6, computer system 600 includes one or more processors 602 that communicate with a number of peripheral devices via a bus subsystem 604. These peripheral devices include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple buses.

Network interface subsystem 616 can serve as an interface for communicating data between computer system 600 and other computer systems or networks. Embodiments of network interface subsystem 616 can include, e.g., an Ethernet card, a Wi-Fi and/or cellular adapter, a modem (telephone, satellite, cable, ISDN, etc.), digital subscriber line (DSL) units, and/or the like.

User interface input devices 612 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 600.

User interface output devices 614 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 600.

Storage subsystem 606 includes a memory subsystem 608 and a file/disk storage subsystem 610. Subsystems 608 and 610 represent non-transitory computer-readable storage media that can store program code and/or data that provide the functionality of embodiments of the present disclosure.

Memory subsystem 608 includes a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than system 600 are possible.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method, executable by a network device, comprising:
receiving a packet from a network at a first port of the network device;
sending the packet to a second port of the network device, the second port comprising an interface and a loopback function implemented at an egress of the interface, the loopback function configured to transmit the packet back to the network device through the interface, wherein the interface is configured to truncate the packet upon receiving the packet from the loopback function; and
upon receiving the truncated packet from the interface of the second port, forwarding the truncated packet to a device through a third port of the network device that is coupled to the device.

2. The method of claim 1 further comprising:
receiving a command to configure an egress truncation feature for the network device, the command specifying the first port as an ingress port and the third port as an egress port; and
in response to receiving the command, automatically configuring the network device to send network traffic received at the first port to the second port, configuring the interface of the second port to truncate the network traffic that ingresses through the second port from the loopback device, and configuring the network device to forward the network traffic received from the second to the third port.

3. The method of claim 1, wherein the first port is a test access point (TAP) port.

4. The method of claim 1, wherein the loopback function is implemented in a physical layer interface coupled to the interface of the second port.

5. The method of claim 1, wherein a physical layer interface is coupled to the interface of the second port, wherein a physical line interface is coupled to the physical layer interface, wherein the loopback function is implemented by a physical cable coupled to the physical line interface.

6. The method of claim 1, wherein a physical layer interface is coupled to the interface of the second port, wherein a physical line interface is coupled to the physical layer interface, wherein the loopback function is implemented by a loopback device coupled to the physical line interface.

7. The method of claim 1, wherein the first port is a unidirectional port configured to receive ingress network traffic.

8. The method of claim 1, wherein the third port is a unidirectional port configured to forward egress network traffic.

9. The method of claim 1, wherein the packet is a first packet, wherein the device is a first device, the method further comprising:
tagging the first packet with a first identifier, wherein the first packet is forwarded to the first device based on the first identifier;
receiving a third packet from a network at a fourth port of the network device;
tagging the third packet with a second identifier;

sending the third packet to the second port of the network device, wherein the loopback function is further configured to transmit the third packet back to the network device through the interface, wherein the interface is further configured to truncate the third packet upon receiving the third packet from the loopback function; and upon receiving the truncated third packet from the interface of the second port, forwarding, based on the second identifier, the third packet to a second device through a fifth port of the network device that is coupled to the second device.

10. The method of claim 1, wherein the packet is a first packet that is a copy of a second packet transmitted through a first existing connection in the network, wherein the device is a first device, the method further comprising:

receiving a third packet from the network at a fourth port of the network device, wherein the third packet is a copy of a fourth packet transmitted through a second existing connection in the network; and upon receiving the third packet from the fourth port, forwarding the third packet to a second device through a fifth port of the network device that is coupled to the second device.

11. The method of claim 1, the packet is a first packet, wherein the device is a first device, the method further comprising:

receiving a third packet from the network at a fourth port of the network device;

sending the third packet to the second port of the network device, wherein the loopback function is further configured to transmit the third packet back to the network device through the interface, wherein the interface is further configured to truncate the third packet upon receiving the third packet from the loopback function; and upon receiving the truncated third packet from the interface of the second port, forwarding the third packet to a second device through a fifth port of the network device that is coupled to the second device.

12. The method of claim 1, wherein the packet is a first packet, wherein the device is a first device, the method further comprising:

upon receiving the first packet from the first port, generating a second packet that is a copy of the first packet; and forwarding the second packet to a second device through a fourth port of the network device that is coupled to the second device.

13. The method of claim 1, wherein the packet is a first packet, wherein the device is a first device, the method further comprising:

upon receiving the first packet from the first port, generating a second packet that is a copy of the first packet;

sending the second packet to the second port of the network device, wherein the loopback function is further configured to transmit the second packet back to the network device through the interface, wherein the interface is further configured to truncate the second packet upon receiving the second packet from the loopback function; and upon receiving the truncated second packet from the interface of the second port, forwarding the second packet to a second device through a fifth port of the network device that is coupled to the second device.

14. The method of claim 1, wherein the network device comprises an ingress packet processing pipeline, wherein the ingress packet processing pipeline receives the truncated packet from the interface of the second port, wherein the ingress packet processing pipeline performs the forwarding of the packet to the device through the third port of the network device.

15. The method of claim 14, wherein the ingress packet processing pipeline comprises a forwarding table, the method further comprising configuring the forwarding table with an entry specifying that network traffic received from the second port is to be forwarded to the third port.

16. The method of claim 15, wherein forwarding the truncated packet to the device comprises:

performing a lookup on the forwarding table; and based on the lookup, determining that the truncated packet matches the entry.

17. The method of claim 1, wherein the interface is a physical layer interface.

18. The method of claim 1, wherein the interface is further configured to truncate the packet to a defined packet size.

19. A network device comprising:

a processor; and a non-transitory machine-readable medium storing instructions that when executed by the processor cause the processor to:

receive a packet from a network at a first port of the network device;

send the packet to a second port of the network device, the second port comprising an interface and a loopback function implemented at an egress of the interface, the loopback function configured to transmit the packet back to the network device through the interface, wherein the interface is configured to truncate the packet upon receiving the packet from the loopback function; and upon receiving the truncated packet from the interface of the second port, forward the truncated packet to a device through a third port of the network device that is coupled to the device.

20. A non-transitory machine-readable medium storing a program executable by at least one processing unit of a network device, the program comprising sets of instructions for:

receiving a packet from a network at a first port of the network device;

sending the packet to a second port of the network device, the second port comprising an interface and a loopback function implemented at an egress of the interface, the loopback function configured to transmit the packet back to the network device through the interface, wherein the interface is configured to truncate the packet upon receiving the packet from the loopback function; and upon receiving the truncated packet from the interface of the second port, forwarding the truncated packet to a device through a third port of the network device that is coupled to the device.

* * * * *